United States Patent
Higo et al.

(10) Patent No.: US 10,364,741 B2
(45) Date of Patent: Jul. 30, 2019

(54) INTERNAL COMBUSTION ENGINE PROVIDED WITH TURBOCHARGER

(71) Applicant: HONDA MOTOR CO., LTD., Tokyo (JP)

(72) Inventors: Yutaka Higo, Wako (JP); Noritaka Sekiya, Wako (JP); Soichiro Nomoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/986,329

(22) Filed: May 22, 2018

(65) Prior Publication Data
US 2018/0363545 A1 Dec. 20, 2018

(30) Foreign Application Priority Data

Jun. 16, 2017 (JP) .................. 2017-118233

(51) Int. Cl.
*F02B 67/10* (2006.01)
*F01N 3/10* (2006.01)
(Continued)

(52) U.S. Cl.
CPC ................ *F02B 67/10* (2013.01); *F01N 3/10* (2013.01); *F01N 5/04* (2013.01); *F01N 13/08* (2013.01);
(Continued)

(58) Field of Classification Search
CPC ..... B60K 13/04; B60K 13/06; F01N 2340/02; F01N 2340/04; F01N 2340/06;
(Continued)

(56) References Cited

U.S. PATENT DOCUMENTS 2,200,744 A * 5/1940 Heinzelmann ........ F01N 13/107
123/193.1
2,233,499 A * 3/1941 Todd ........................ F01B 7/14
123/195 A
(Continued)

FOREIGN PATENT DOCUMENTS

JP 2000328951 A 11/2000
JP 2005282399 A 10/2005
(Continued)

OTHER PUBLICATIONS

Decision to Grant a Patent for JP Application No. 2017-118233, dated Oct. 30, 2018, 3 pages.

*Primary Examiner* — Mark A Laurenzi
*Assistant Examiner* — Mickey H France
(74) *Attorney, Agent, or Firm* — Armstrong Teasdale LLP

(57) ABSTRACT

An internal combustion engine, includes: an engine main body; a structural member disposed around the engine main body; a bracket including a support plate and a plurality of leg pieces depending from the support plate and connected to the structural member; a turbocharger including a turbine and a compressor, the turbine being connected to a side of the support plate opposite to the structural member; an exhaust pipe connected to a central part of the turbine and extending in a direction away from the compressor; and an engine auxiliary disposed between the structural member and the support plate, wherein the leg pieces are arranged unevenly to provide a higher heat shielding performance on a side of the exhaust pipe than on a side of the compressor with respect to the support plate.

8 Claims, 7 Drawing Sheets

(51) Int. Cl.
| | | |
|---|---|---|
| *F01N 13/14* | (2010.01) | |
| *F02B 75/22* | (2006.01) | |
| *F02B 77/11* | (2006.01) | |
| *F02N 15/00* | (2006.01) | |
| *F16H 57/025* | (2012.01) | |
| *F01N 5/04* | (2006.01) | |
| *F01N 13/08* | (2010.01) | |
| *F01N 13/18* | (2010.01) | |
| *F02B 37/00* | (2006.01) | |
| *F16H 57/02* | (2012.01) | |

(52) U.S. Cl.
CPC ............ *F01N 13/14* (2013.01); *F01N 13/185* (2013.01); *F01N 13/1805* (2013.01); *F01N 13/1855* (2013.01); *F01N 13/1861* (2013.01); *F01N 13/1872* (2013.01); *F02B 75/22* (2013.01); *F02B 77/11* (2013.01); *F02N 15/006* (2013.01); *F16H 57/025* (2013.01); *F01N 2260/20* (2013.01); *F01N 2340/04* (2013.01); *F01N 2340/06* (2013.01); *F01N 2450/20* (2013.01); *F01N 2450/24* (2013.01); *F02B 37/00* (2013.01); *F16H 2057/0203* (2013.01)

(58) Field of Classification Search
CPC ........ F01N 13/14; F01N 13/08; F01N 13/008; F01N 13/102; F01N 13/1811; F01N 3/0211; F01N 3/2839; F02B 67/00–10; F02B 33/00; F02B 37/00; F02B 39/00; F02B 77/11; F02B 77/089; F02N 15/006
USPC ................. 180/296, 309, 89.2; 60/598, 280; 123/559.1, 565, 195 A
See application file for complete search history.

(56) References Cited

U.S. PATENT DOCUMENTS

| | | | | |
|---|---|---|---|---|
| 2,858,666 | A * | 11/1958 | Fullemann | F02B 29/0462 123/65 BA |
| 4,196,593 | A * | 4/1980 | Froeliger | F02B 37/013 60/612 |
| 4,233,815 | A * | 11/1980 | Melchior | F02B 37/013 60/606 |
| 4,294,073 | A * | 10/1981 | Neff | F01N 13/10 415/205 |
| 4,400,945 | A * | 8/1983 | Deutschmann | F02B 29/0412 417/407 |
| 4,471,731 | A * | 9/1984 | Kasting | F02B 77/00 123/195 C |
| 4,474,007 | A * | 10/1984 | Kronogard | F02B 37/00 417/407 |
| 4,862,859 | A * | 9/1989 | Yunick | F02M 15/00 123/545 |
| 5,168,706 | A * | 12/1992 | Kawamura | F02B 37/005 123/585 |
| 5,544,486 | A * | 8/1996 | Lu | F02B 29/0412 60/599 |
| 5,560,207 | A * | 10/1996 | Ramsden | F02B 37/007 60/322 |
| 6,125,799 | A * | 10/2000 | Van Son | F02B 67/00 123/195 A |
| 7,222,614 | B2 | 5/2007 | Bryant | F01L 1/146 123/559.1 |
| 7,806,110 | B1 * | 10/2010 | Broman | F02B 67/10 123/196 W |
| 8,215,113 | B2 * | 7/2012 | Hudson | F01M 11/02 60/605.3 |
| 9,086,011 | B2 * | 7/2015 | Roth | F02B 37/025 |
| 9,163,586 | B2 * | 10/2015 | Johnson | F02B 37/16 |
| 9,217,394 | B2 * | 12/2015 | Kurata | F02B 37/004 |
| 9,273,595 | B2 * | 3/2016 | Kim | F02B 37/001 |
| 9,435,253 | B2 * | 9/2016 | Luhrmann | F02B 29/0412 |
| 9,587,588 | B2 * | 3/2017 | Wade | F02C 6/12 |
| 9,670,883 | B2 * | 6/2017 | Matsuishi | F02M 35/10222 |
| 2001/0039908 | A1 * | 11/2001 | Bilek | F01B 1/12 114/55.5 |
| 2002/0056444 | A1 * | 5/2002 | Chou | F02B 29/0412 123/559.1 |
| 2004/0040300 | A1 * | 3/2004 | Klingel | F02B 37/013 60/612 |
| 2005/0235942 | A1 * | 10/2005 | McCullagh | F01B 1/12 123/184.34 |
| 2008/0098998 | A1 * | 5/2008 | Dicke | F02B 29/0443 123/563 |
| 2008/0229743 | A1 * | 9/2008 | Nelson | F01N 13/107 60/598 |
| 2009/0078240 | A1 * | 3/2009 | Diggs | F01L 1/182 123/559.1 |
| 2009/0159057 | A1 * | 6/2009 | Pursifull | F02M 63/0225 123/575 |
| 2009/0320469 | A1 * | 12/2009 | Palazzolo | F01M 11/02 60/624 |
| 2010/0040467 | A1 * | 2/2010 | Mudel | F01D 25/243 415/214.1 |
| 2010/0163132 | A1 * | 7/2010 | Becker | B60R 13/0876 138/147 |
| 2010/0205949 | A1 * | 8/2010 | Bolda | B01D 46/12 60/309 |
| 2011/0005197 | A1 * | 1/2011 | Berg | F01N 13/08 60/272 |
| 2011/0173972 | A1 * | 7/2011 | Wade | F01N 13/10 60/602 |
| 2011/0296835 | A1 * | 12/2011 | Ebisu | F02B 37/025 60/611 |
| 2011/0308486 | A1 * | 12/2011 | Dorothy | F02B 75/20 123/41.74 |
| 2012/0003075 | A1 * | 1/2012 | Niwa | F01D 25/18 415/111 |
| 2012/0090320 | A1 * | 4/2012 | Kuhlbach | F01N 13/10 60/611 |
| 2012/0102932 | A1 * | 5/2012 | Mitsuda | F01N 3/0211 60/311 |
| 2012/0159946 | A1 * | 6/2012 | Sauerstein | F01D 9/026 60/598 |
| 2012/0240574 | A1 * | 9/2012 | Friedfeldt | F02B 37/001 60/602 |
| 2012/0285139 | A1 * | 11/2012 | Geyer | F01N 3/0885 60/274 |
| 2013/0047605 | A1 * | 2/2013 | Drangel | F02B 39/005 60/605.1 |
| 2013/0098002 | A1 * | 4/2013 | Danckert | F01N 3/2892 60/282 |
| 2013/0247565 | A1 * | 9/2013 | Marques | F01D 25/28 60/605.1 |
| 2013/0298551 | A1 * | 11/2013 | Shin | F01N 13/00 60/605.1 |
| 2014/0116036 | A1 * | 5/2014 | Karim | F01N 3/046 60/321 |
| 2014/0318119 | A1 * | 10/2014 | Svihla | F02B 29/0412 60/599 |
| 2014/0373821 | A1 * | 12/2014 | Kitagawa | F01M 11/08 123/572 |
| 2015/0114364 | A1 * | 4/2015 | Matsuda | F02B 39/12 123/559.1 |
| 2015/0204221 | A1 * | 7/2015 | Fukuyoshi | F01N 13/0097 248/639 |
| 2016/0076437 | A1 * | 3/2016 | Tiwari | F02B 37/02 60/605.1 |
| 2016/0090902 | A1 * | 3/2016 | Svihla | F01N 13/08 105/62.1 |
| 2016/0090948 | A1 * | 3/2016 | Svihla | F02M 35/10157 105/62.1 |
| 2016/0115909 | A1 * | 4/2016 | Begin | F16C 32/0651 60/605.3 |
| 2016/0215785 | A1 * | 7/2016 | Begin | F04D 29/056 |

(56) References Cited

U.S. PATENT DOCUMENTS

| | | | |
|---|---|---|---|
| 2016/0251997 A1* | 9/2016 | Sandou | F01N 3/106 60/302 |
| 2016/0252008 A1* | 9/2016 | Hamaoka | F02B 37/013 60/599 |
| 2016/0265419 A1* | 9/2016 | Pelei | F02B 29/045 |
| 2016/0281591 A1* | 9/2016 | Nakagawa | F02B 37/013 |
| 2017/0082041 A1* | 3/2017 | Hirose | F02D 41/0007 |
| 2017/0204770 A1* | 7/2017 | Kimura | B60K 13/04 |
| 2017/0234207 A1* | 8/2017 | Kondo | F02B 29/045 60/599 |
| 2017/0284249 A1* | 10/2017 | Oilar | F01N 3/046 |
| 2017/0356398 A1* | 12/2017 | Bremmer | F02M 26/22 |
| 2018/0030875 A1* | 2/2018 | Kamo | F01N 3/2892 |
| 2018/0163620 A1* | 6/2018 | Eriksson | F02B 39/14 |
| 2018/0258868 A1* | 9/2018 | Hagiwara | F02D 41/3064 |
| 2018/0283269 A1* | 10/2018 | Wu | F02B 39/14 |
| 2018/0298840 A1* | 10/2018 | Hagiwara | F02B 43/00 |
| 2018/0372002 A1* | 12/2018 | Aucamp | F01N 3/04 |

FOREIGN PATENT DOCUMENTS

| | | | |
|---|---|---|---|
| JP | 2010106810 A | 5/2010 | |
| JP | 2015086724 A | 5/2015 | |
| JP | 2016-191304 A | 11/2016 | |

\* cited by examiner

INTERNAL COMBUSTION ENGINE PROVIDED WITH TURBOCHARGER

TECHNICAL FIELD

The present invention relates to an internal combustion engine provided with a turbocharger.

BACKGROUND ART

With regard to an internal combustion engine provided with a turbocharger, it is known to provide a pedestal on a side of an engine main body to support a turbocharger on the pedestal (see JP2016-191304A, for example). The turbocharger is mounted on an upper surface of a support plate constituting a part of the pedestal, and an air cooler (intercooler) is disposed below the support plate. In this configuration, the support plate prevents the heat generated by the turbocharger from being transmitted to the air cooler, and therefore, the turbocharger and the air cooler can be arranged close to each other.

In a case where an internal combustion engine is disposed in a small space such as when the internal combustion engine is mounted on an automobile, it is often difficult to secure a large distance from an engine auxiliary to not only the turbocharger but also an exhaust pipe extending from the turbocharger to an exhaust outlet. Therefore, it is preferred that the engine auxiliary be shielded from not only the heat from the turbocharger but also the heat from the exhaust pipe extending from the turbocharger.

SUMMARY OF THE INVENTION

In view of the above prior art, a primary object of the present invention is to provide an internal combustion engine provided with a turbocharger, in which the engine auxiliary is shielded from the heat from the turbocharger and the exhaust pipe.

MEANS TO ACCOMPLISH THE TASK

To achieve the above object, an embodiment of the present invention provides an internal combustion engine (1), comprising: an engine main body (5); a structural member (7) disposed around the engine main body; a bracket (12) including a support plate (13) and a plurality of leg pieces (15, 16, 17) depending from the support plate and connected to the structural member; a turbocharger (10) including a turbine (42) and a compressor (44), the turbine being connected to a side of the support plate opposite to the structural member; an exhaust pipe (60) connected to a central part of the turbine and extending in a direction away from the compressor; and an engine auxiliary (65) disposed between the structural member and the support plate, wherein the leg pieces are arranged unevenly to provide a higher heat shielding performance on a side of the exhaust pipe than on a side of the compressor with respect to the support plate.

According this arrangement, the leg pieces provided on the side of the exhaust pipe with respect to the support plate shield the heat from the exhaust pipe to the engine auxiliary, and therefore, heat reception by the engine auxiliary is suppressed. Because the leg pieces are arranged unevenly to provide a higher heat shielding performance on the side of the exhaust pipe than on the side of the compressor with respect to the support plate, the heat from the exhaust pipe can be blocked efficiently.

In the above arrangement, preferably, the one or more leg pieces provided on the side of the exhaust pipe with respect to the support plate are greater in number than the one or more leg pieces provided on the side of the compressor.

According this arrangement, the leg pieces can be easily arranged unevenly to provide a higher heat shielding performance on the side of the exhaust pipe than on the side of the compressor with respect to the support plate, whereby the heat from the exhaust pipe can be blocked efficiently.

In the above arrangement, preferably, the one or more leg pieces provided on the side of the exhaust pipe with respect to the support plate have a larger width than the one or more leg pieces provided on the side of the compressor.

According this arrangement, the leg pieces can be easily arranged unevenly to provide a higher heat shielding performance on the side of the exhaust pipe than on the side of the compressor with respect to the support plate, the heat transmitted from the exhaust pipe to the engine auxiliary can be reduced efficiently.

In the above arrangement, preferably, two of the leg pieces provided on the side of the exhaust pipe are connected to each other by an expansion wall (31).

According this arrangement, the expansion wall contributes to reducing the heat transmitted from the exhaust pipe to the engine auxiliary.

In the above arrangement, preferably, an opening (35) for allowing access to the engine auxiliary is defined between the one or more leg pieces provided on the side of the exhaust pipe and the one or more leg pieces provided on the side of the compressor.

According this arrangement, viewing and maintenance of the engine auxiliary can be achieved through the opening.

In the above arrangement, preferably, the exhaust pipe includes a catalytic converter (60) in a part thereof adjacent to the turbine.

According this arrangement, it is possible to efficiently reduce the heat transmitted from the catalytic converter, which has a relatively large volume, to the engine auxiliary.

In the above arrangement, preferably, the structural member consists of a transmission (7) connected to the engine main body, the bracket is mounted on an upper surface (8A) of the transmission, and the engine auxiliary consists of a starter motor (65).

According this arrangement, a space above the transmission can be used to place the turbocharger.

In the above arrangement, preferably, the engine main body includes two banks (3, 4) to form a V-type internal combustion engine, and the turbine is disposed on a side of a space defined between the two banks.

According this arrangement, the exhaust pipes (upstream exhaust pipes) extending from the respective banks to the turbine can have a substantially same length, and this improves the exhaust efficiency.

According to the foregoing arrangement, it is possible to provide an internal combustion engine provided with a turbocharger, in which the engine auxiliary is shielded from the heat from the turbocharger and the exhaust pipe.

DESCRIPTION OF THE PREFERRED EMBODIMENT(S)

In the following, an embodiment of an internal combustion engine to which the present invention is applied will be described with reference to the drawings.

Figure 1:
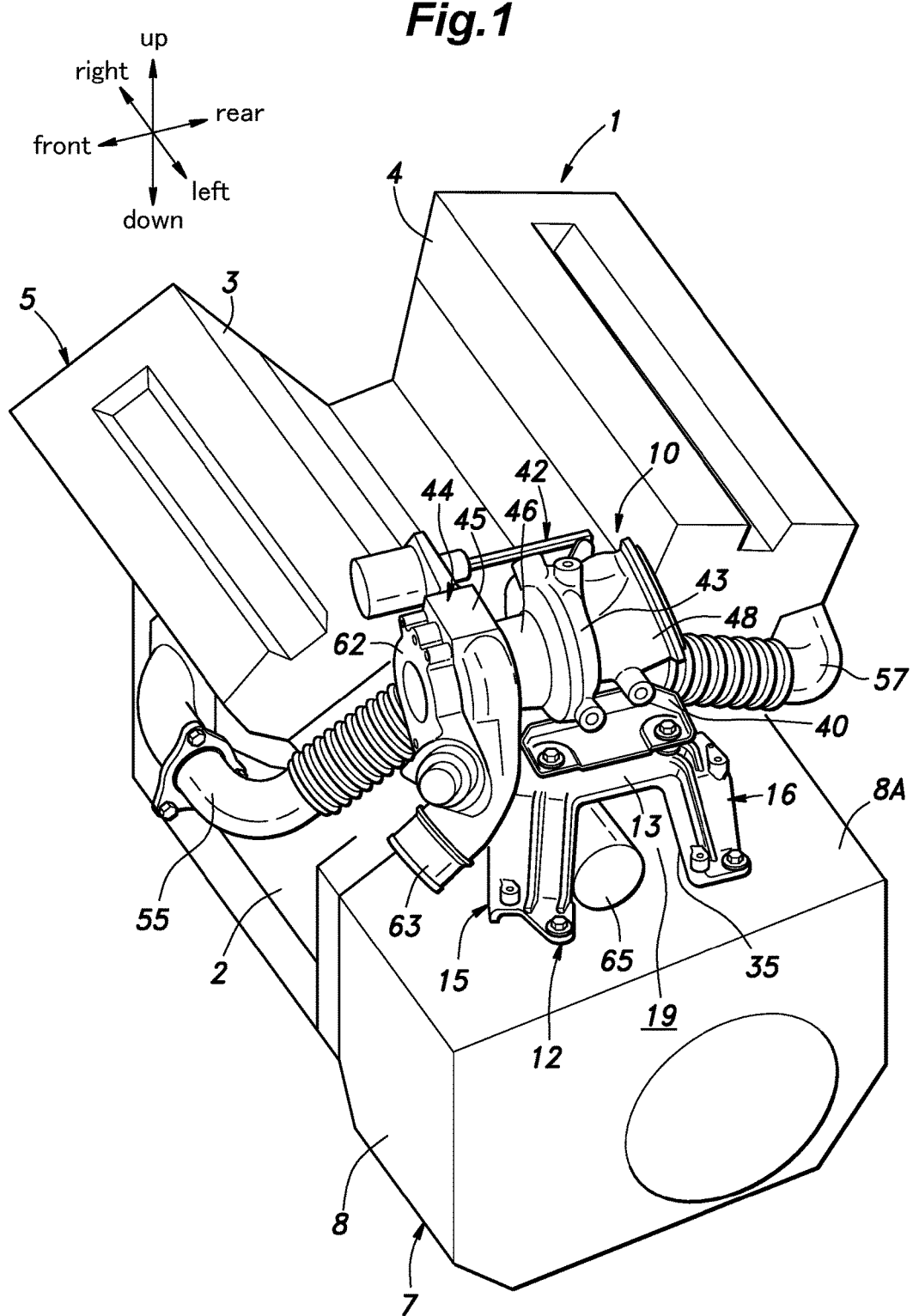
FIG. 1 is a perspective view of an internal combustion engine according to a preferred embodiment of the present invention.

As shown in FIG. 1, an internal combustion engine 1 for an automobile consists of a transverse V-type engine, and has an engine main body 5 including a crankcase 2 and a front cylinder bank 3 and a rear cylinder bank 4 provided on top of the crankcase 2. The front cylinder bank 3 and the rear cylinder bank 4 each extend laterally (or in the left-right direction) and define a plurality of cylinders. The front cylinder bank 3 tilts forward about a laterally extending crankshaft, while the rear cylinder bank 4 tilts rearward about the crankshaft. The front cylinder bank 3 has a plurality of intake ports opening out in a rear surface thereof and connected to the respective cylinders and a plurality of exhaust ports opening out in a front surface thereof and connected to the respective cylinders. The rear cylinder bank 4 has a plurality of intake ports opening out in a front surface thereof and connected to the respective cylinders and a plurality of exhaust ports opening out in a rear surface thereof and connected to the respective cylinders.

A transmission 7 is provided on a left end of the crankcase 2. The transmission 7 includes a transmission case 8 forming an outer shell thereof The front cylinder bank 3 and the rear cylinder bank 4 protrude upward above a case top 8A which is an upper surface of the transmission case 8.

A bracket 12 is provided on the case top 8A for supporting a turbocharger 10, which will be described later. The bracket 12 includes a support plate 13 having a vertically facing surface and a plurality of leg pieces 15, 16, 17 depending from a peripheral edge of the support plate 13. In the illustrated embodiment, the bracket 12 has three leg pieces including first to third pieces 15, 16, 17, and is connected to the case top 8A at each of the leg pieces 15, 16, 17.

As shown in FIGS. 3 to 7, the support plate 13 is disposed to be spaced upward from the case top 8A, such that an accommodation space 19 is defined between the support plate 13 and the case top 8A. The first leg piece 15 depends from a left portion of a front edge of the support plate 13, the second leg piece 16 depends from a left portion of a rear edge of the support plate 13, and the third leg piece 17 depends from a right portion of the rear edge of the support plate 13. The first to third leg pieces 15-17 are arranged around the accommodation space 19.

Figure 4:
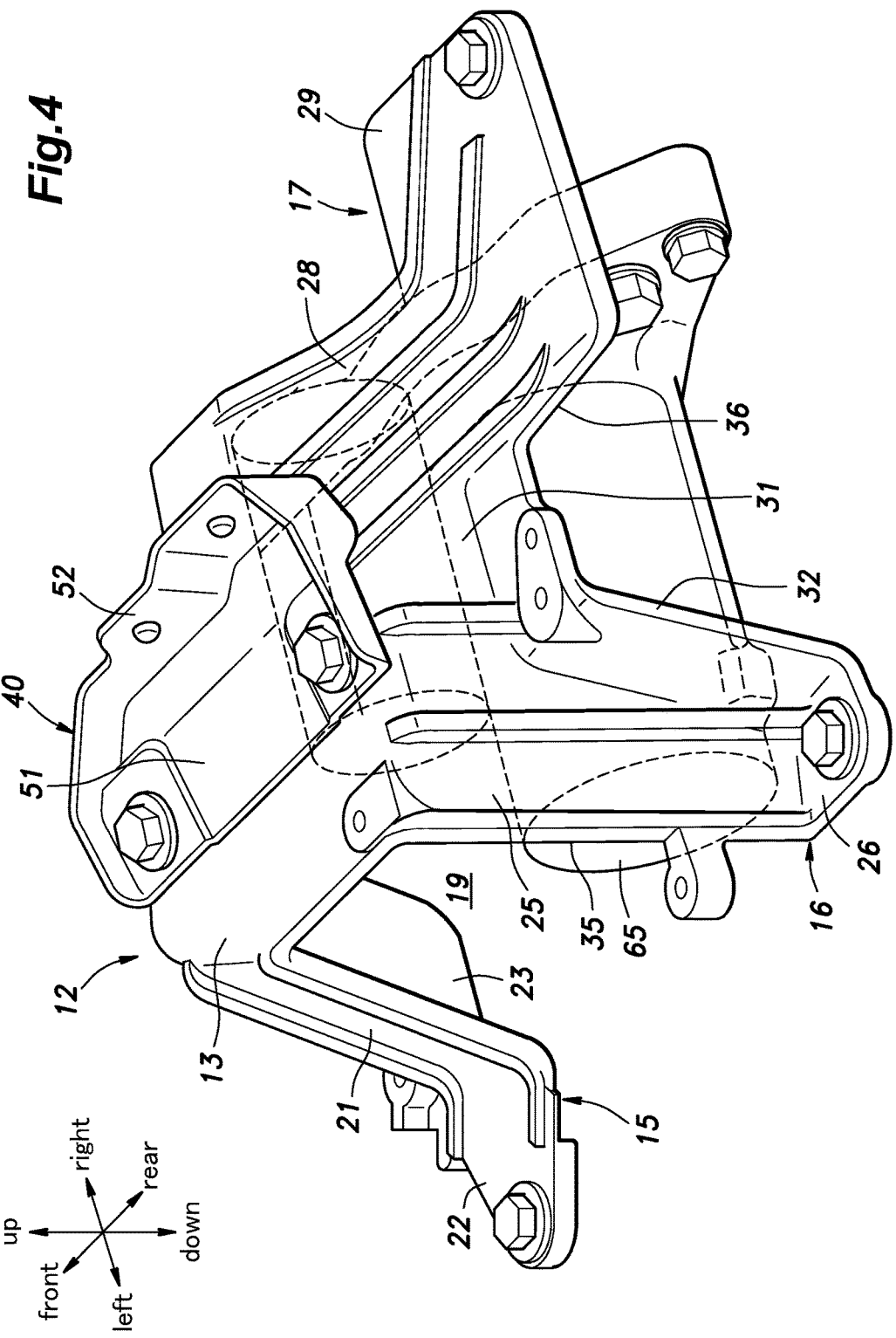
FIG. 4 is a perspective view showing the bracket and a starter motor.
Figure 5:
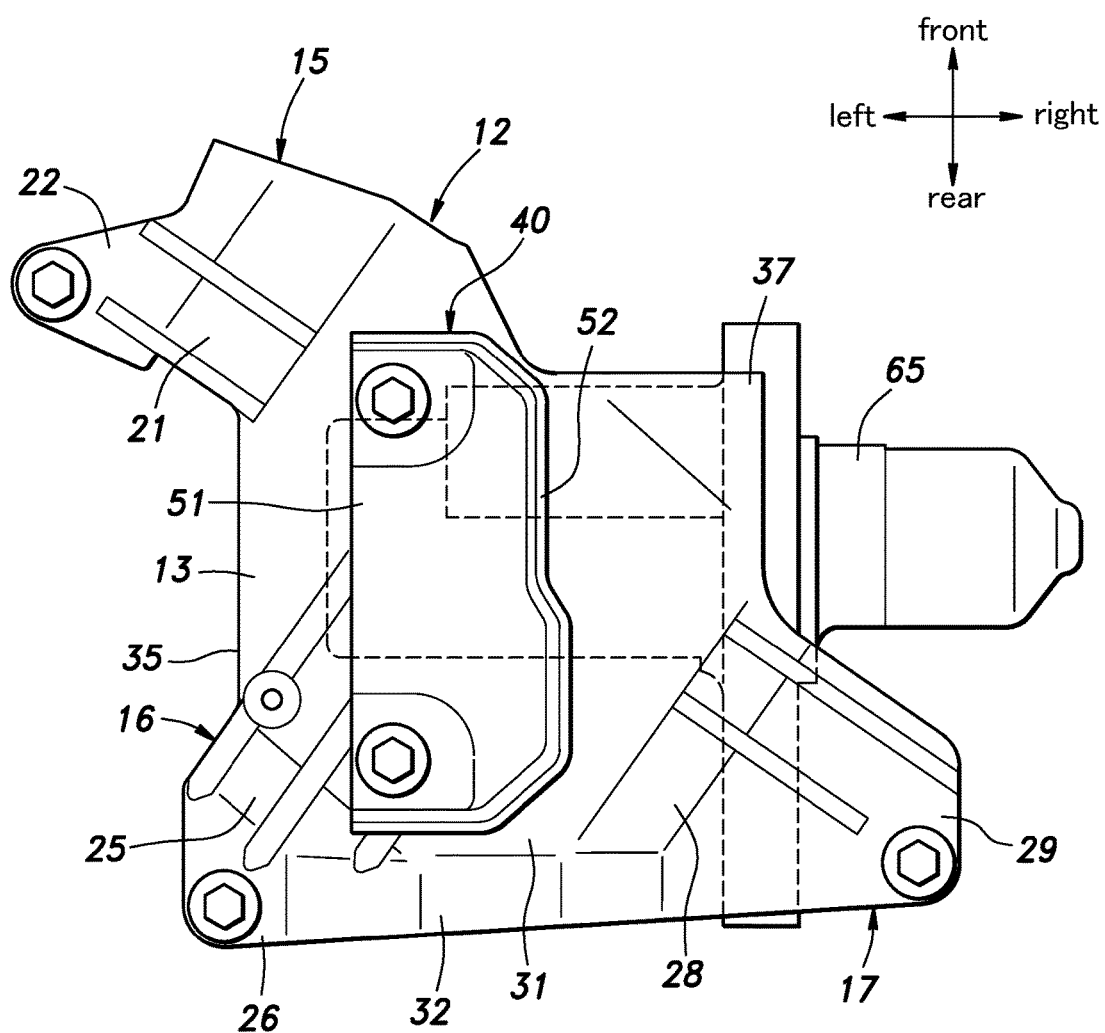
FIG. 5 is a plan view showing the bracket and the starter motor.
Figure 6:
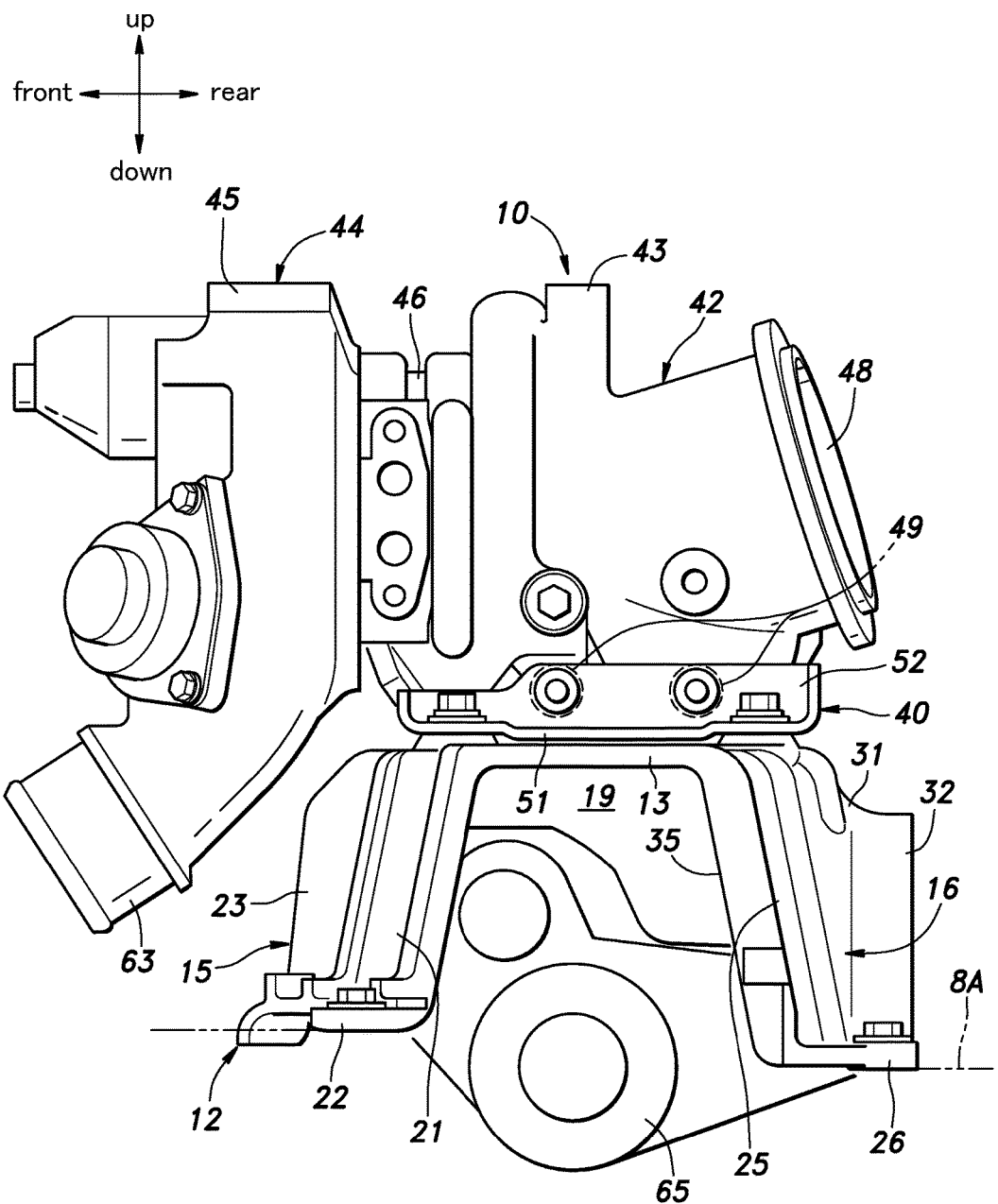
FIG. 6 is a side view showing the turbocharger, the bracket, and the starter motor.
Figure 7:
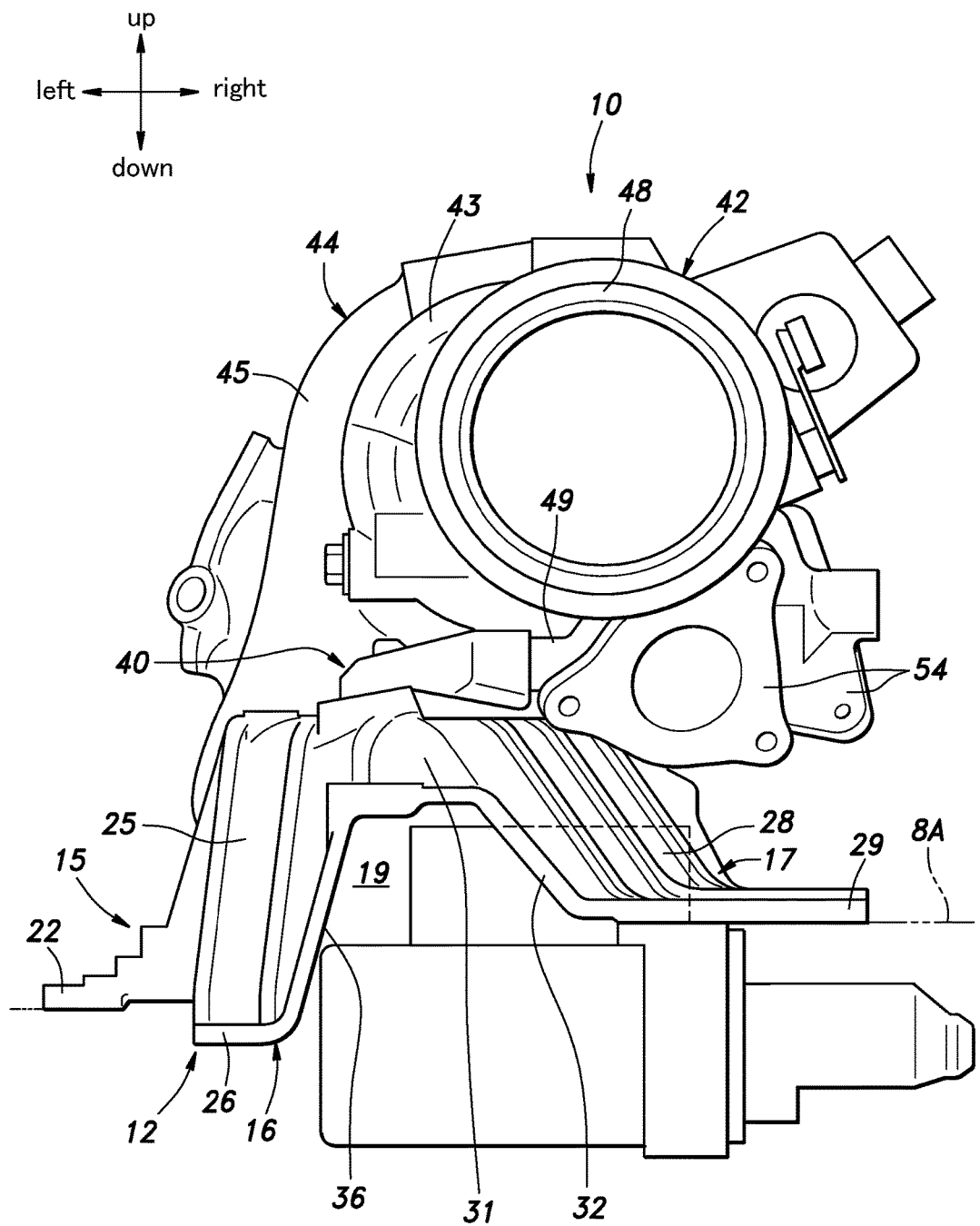
FIG. 7 is a rear view showing the turbocharger, the bracket, and the starter motor.

As shown in FIGS. 4 to 6, the first leg piece 15 includes a first side wall portion 21 having a surface facing in a front left direction and extending vertically and a first fastening portion 22 provided at a lower end of the first side wall portion 21 and having a vertically facing surface. A first edge wall portion 23 is provided to extend along a right edge of the first side wall portion 21 from the support plate 13 to the first fastening portion 22, wherein the first edge wall portion 23 is bent relative to the first side wall portion 21 to extend in the rightward direction. The first leg piece 15 is formed by the first side wall portion 21, the first edge wall portion 23, and the first fastening portion 22 in a three-dimensional shape to have an increased stiffness.

As shown in FIGS. 3 to 5 and 7, the second leg piece 16 includes a second side wall portion 25 having a surface facing in a rear left direction and extending vertically and a second fastening portion 26 provided at a lower end of the second side wall portion 25 and having a vertically facing surface. The third leg piece 17 includes a third side wall portion 28 having a surface facing in a rear right direction and extending vertically and a third fastening portion 29 provided at a lower end of the third side wall portion 28 and having a vertically facing surface. A right end of a base end portion of the second side wall portion 25 and a left end of a base end portion of the third side wall portion 28 are connected to each other by an expansion wall 31 having a rearward facing surface and extending laterally. An upper end of the expansion wall 31 is connected to a rear end of the support plate 13. A second edge wall portion 32 is provided to extend from the second fastening portion 26 to the third fastening portion 29 along a right edge of the second side wall portion 25, a lower edge of the expansion wall 31, and a left edge of the third side wall portion 28, wherein the second edge wall portion 32 is bent relative to the second side wall portion 25, the expansion wall 31, and the third side wall portion 28 to extend in the rearward direction. The second leg piece 16 is formed by the second side wall portion 25, the second edge wall portion 32, and the second fastening portion 26 in a three-dimensional shape to have an increased stiffness. The third leg piece 17 is formed by the third side wall portion 28, the second edge wall portion 32, and the third fastening portion 29 in a three-dimensional shape to have an increased stiffness.

As shown in FIG. 1, the bracket 12 is fastened to the case top 8A by means of bolts at the first fastening portion 22, the second fastening portion 26, and the third fastening portion 29. Each of the first side wall portion 21, the second side wall portion 25, and the third side wall portion 28 is provided with one or more reinforcement ribs extending in a longitudinal direction. The support plate 13 is provided on an underside thereof with reinforcement ribs arranged in a grid-like shape, for example.

Figure 3:
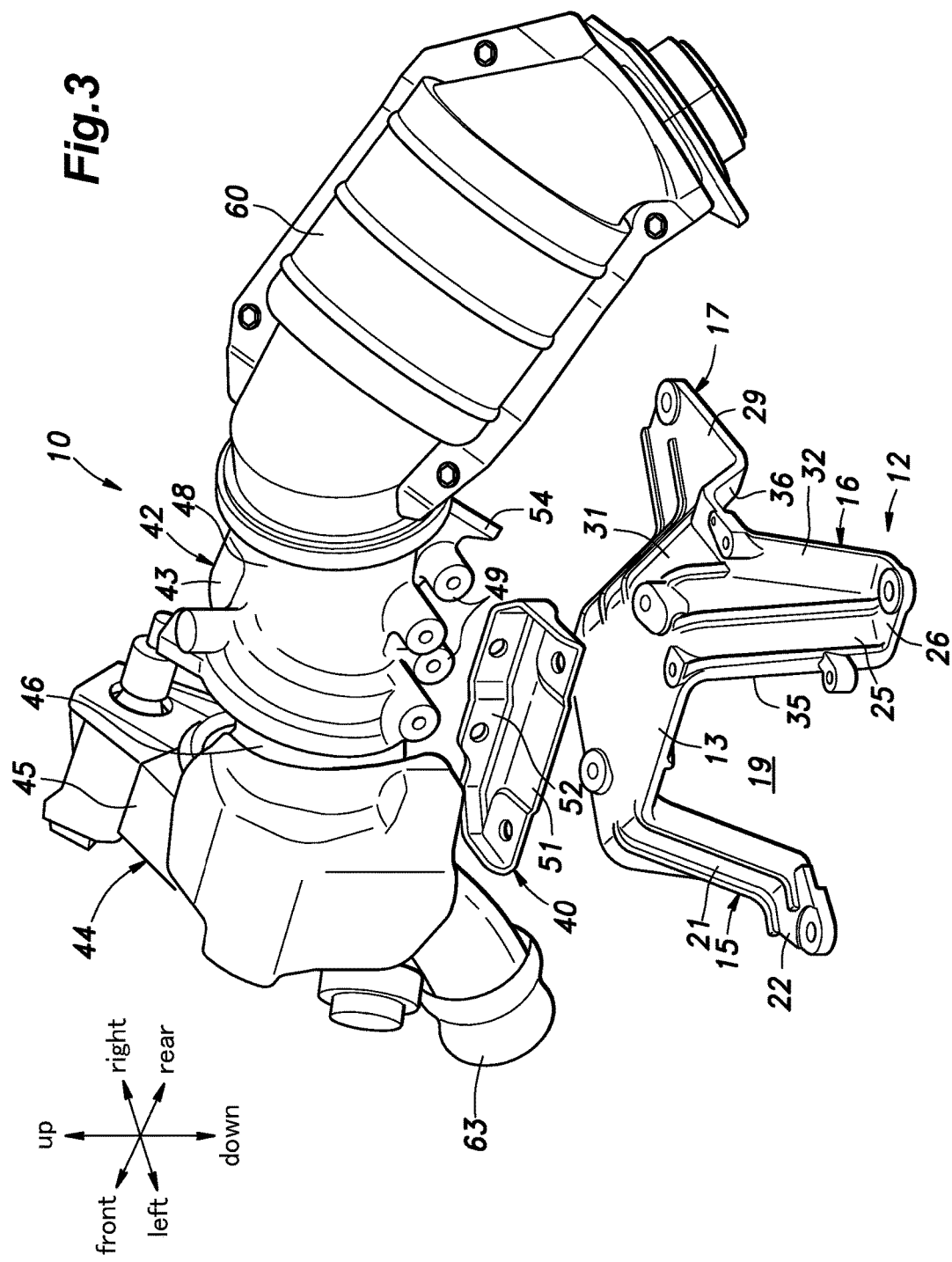
FIG. 3 is an exploded perspective view showing a turbocharger and a bracket.

As shown in FIG. 3, the first leg piece 15 and the second leg piece 16 are spaced from each other in the front-rear direction, whereby the support plate 13, the first leg piece 15, the second leg piece 16, and the case top 8A jointly define a first opening 35 that faces in the lateral direction. The support plate 13, the second leg piece 16, the expansion wall 31, the third leg piece 17, and the case top 8A jointly define a second opening 36 that faces in the front-rear direction. The second opening 36 is defined to have a smaller opening area than the first opening 35. The distance between the second leg piece 16 and the third leg piece 17 is set to be smaller than the distance between the first leg piece 15 and the second leg piece 16. It is preferred that the second leg piece 16 and the third leg piece 17 each have a larger width than the first leg piece 15. Owing to these features, the accommodation space 19, which is a space between the case top 8A and the support plate 13, is shielded from the outside more intensely on the front side than on the rear side.

As shown in FIG. 5, the support plate 13 is provided on the front right part thereof with an extension portion 37 extending in the front right direction. The extension portion 37 is located to the right of the first leg piece 15 and in front of the third leg piece 17 as seen in plan view, and increases the area of the support plate 13 as seen in plan view.

As shown in FIG. 1, the bracket 12 is mounted on the case top 8A to be located to the left of the space between the front cylinder bank 3 and the rear cylinder bank 4.

As shown in FIGS. 1 and 3, the bracket 12 supports the turbocharger 10 via an auxiliary bracket 40. The turbocharger 10 includes a turbine housing 43 forming an outer shell of a turbine 42, a compressor housing 45 forming an outer shell of a compressor 44, and a bearing housing 46 connecting the turbine housing 43 and the compressor housing 45 to each other. The turbine housing 43, the compressor housing 45, and the bearing housing 46 are each formed in a cylindrical shape and are arranged coaxially to one another.

An exhaust outlet portion 48 is provided in a central part of the turbine housing 43 on a side opposite to a side adjacent to the compressor housing 45. The exhaust outlet portion 48 is formed in a tubular shape and extends in a direction away from the compressor housing 45. The turbine housing 43 is formed with fastening seats 49 to which the auxiliary bracket 40 is fastened. The auxiliary bracket 40 is made of a sheet metal, and includes a plate-shaped bottom portion 51 and an upright plate portion 52 bent upward along an edge of the bottom portion 51. The auxiliary bracket 40 is fastened to the fastening seats 49 at the upright plate portion 52, and to the support plate 13 of the bracket 12 at the bottom portion 51. The turbocharger 10 is mounted on the bracket 12 via the auxiliary bracket 40, and in this state, an axis of rotation thereof extends substantially in parallel with the support plate 13, and the turbine housing 43 is disposed to the left of a space defined between the front cylinder bank 3 and the rear cylinder bank 4.

Figure 2:
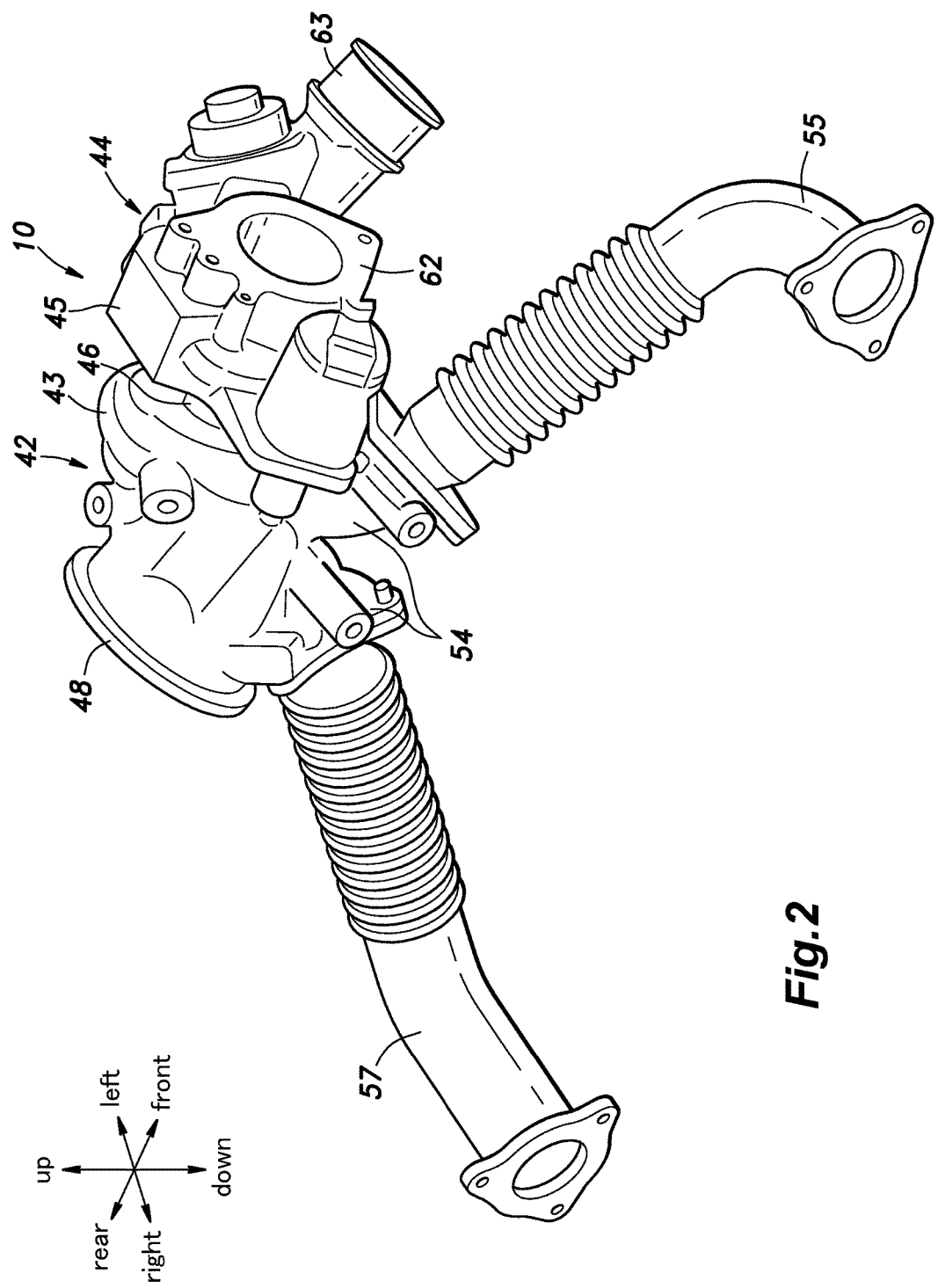
FIG. 2 is a perspective view showing a turbocharger and upstream exhaust pipes.

As shown in FIG. 2, two exhaust inlet portions 54 are provided on an outer periphery of the turbine housing 43. One of the exhaust inlet portions 54 is connected to an exhaust port of the front cylinder bank 3 via a front upstream exhaust pipe 55. The other of the exhaust inlet portions 54 is connected to an exhaust port of the rear cylinder bank 4 via rear upstream exhaust pipe 57. Thereby, the exhaust gas produced in the front cylinder bank 3 and the rear cylinder bank 4 enters the turbine 42 through the exhaust inlet portions 54.

As shown in FIG. 3, a catalytic converter 60 is connected to the exhaust outlet portion 48. The catalytic converter 60 is formed in a tubular shape and extends from the exhaust outlet portion 48 rearward (or in a direction away from the compressor 44) and downward in a straight manner. The catalytic converter 60 constitutes a part of a downstream exhaust pipe, which includes a silencer (not shown in the drawings) provided downstream of the catalytic converter 60 and defines an exhaust outlet (not shown in the drawings) at the downstream end thereof.

As shown in FIGS. 1 and 6, the bearing housing 46 and the compressor housing 45 are disposed in front of the turbine housing 43, and also in front of the support plate 13 as seen in plan view. An intake air inlet portion 62 is provided in a central part of the compressor housing 45, and an intake air outlet portion 63 is provided on an outer periphery of the compressor housing 45. An upstream intake pipe (not shown in the drawings) having an intake air inlet at an upstream end thereof is connected to the intake air inlet portion 62, and a downstream intake pipe (not shown in the drawings) is connected to the intake air outlet portion 63. The downstream intake pipe is connected, via an intercooler, to the intake ports opening in the rear face of the front cylinder bank 3 and the front face of the rear cylinder bank 4.

As shown in FIGS. 1 and 4 to 7, a starter motor 65, which is an example of an engine auxiliary, is disposed in the accommodation space 19 defined between the case top 8A and the support plate 13. The starter motor 65 has a generally cylindrical shape and is fastened to the case top 8A. The starter motor 65 is located rearward of the first leg piece 15 and frontward of the second leg piece 16 and the third leg piece 17, and extends in a lateral direction. A part of the starter motor 65 is located under the extension portion 37 of the support plate 13 as seen in plan view. The left end of the starter motor 65 is located under the support plate 13 so as to oppose the first opening 35.

Technical advantages of the internal combustion engine 1 configured as above will be described below. The bracket 12 supporting the turbocharger 10 includes the support plate 13 over which the turbine 42 is mounted and below which the accommodation space 19 is defined. The accommodation space 19 accommodates an engine auxiliary such as the starter motor 65 therein. The support plate 13 serves as a heat shield plate that blocks the heat transmitted from the turbine 42 to the starter motor 65, to thereby suppress heat reception by the starter motor 65.

Further, the first to third leg pieces 15-17 arranged around the accommodation space 19 also serve as heat shield plates. The first leg piece 15 is placed on a side (front side) of the support plate 13 close to the compressor 44, while the second leg piece 16 and the third leg piece 17 are placed on a side (rear side) of the support plate 13 close to the exhaust pipe including the catalytic converter 60, whereby the leg pieces 15 to 17 are arranged unevenly to provide a higher heat shielding performance on the side of the exhaust pipe including the catalytic converter 60 (rear side) than on the side of the compressor 44 (front side) with respect to the support plate 13. Therefore, the leg pieces 15 to 17 can efficiently shield the heat transmitted from the exhaust pipe including the catalytic converter 60 to the starter motor 65.

Because the expansion wall 31 is provided between the second leg piece 16 and the third leg piece 17 such that the expansion wall 31 reduces an area of the opening defined between the second leg piece 16 and the third leg piece 17 and serves as a heat shield plate, the heat transmitted from the exhaust pipe including the catalytic converter 60 to the starter motor 65 can be blocked even more effectively. Further, the second edge wall portion 32 provided along the edges of the second leg piece 16, the third leg piece 17, and the expansion wall 31 also functions as a heat shield plate. In addition, the second leg piece 16 and the third leg piece 17 are preferably provided with an increased width, and this reduces the opening defined between the second leg piece 16 and the third leg piece 17 to thereby improve the heat shielding performance even further.

The support plate 13 includes the extension portion 37, such that a part thereof overlapping the starter motor 65 as seen in plan view is increased. Thereby, the support plate 13 can shield the heat transmitted from the turbine 42 to the starter motor 65 even more effectively.

The first opening 35 defined between the first leg piece 15 and the second leg piece 16 has a larger opening area than the second opening 36 defined between the second leg piece 16 and the third leg piece 17, and this allows visual inspection and maintenance work of the starter motor 65. Namely, the first opening 35 enables easy access to the starter motor 65 from outside.

The turbocharger 10 and the bracket 12 are disposed around the engine main body 5 by use of a space on a side of the engine main body 5 and above the transmission 7, and therefore, the internal combustion engine 1 can be made compact. Further, because the turbine 42 is disposed on a side of the space defined between the front cylinder bank 3 and the rear cylinder bank 4, the front upstream exhaust pipe 55 and the rear upstream exhaust pipe 57 have a substantially same length, and this improves the exhaust efficiency.

The concrete embodiment of the present invention has been described in the foregoing, but the present invention is not limited to the embodiment and may be modified in various ways. For example, in the above embodiment, the bracket 12 was mounted on the transmission case 8, but the bracket 12 may be mounted on another structural member such as the engine main body 5, a vehicle body frame, etc. Further, the component(s) disposed in the accommodation space 19 may include, in place of or in addition to the starter motor 65, any per se known engine auxiliaries, such as a water pump, an alternating current generator (ACG), a fuel pump, a hydraulic control unit, an electronic control unit, etc. The number of the leg pieces 15, 16, 17 of the bracket 12 is not limited to three, and may be two or more than three.

The invention claimed is:

1. An internal combustion engine, comprising:
an engine main body;
a structural member disposed around the engine main body;
a bracket including a support plate and a plurality of leg pieces depending from the support plate and connected to the structural member;
a turbocharger including a turbine and a compressor, the turbine being connected to a side of the support plate opposite to the structural member;
an exhaust pipe connected to a central part of the turbine and extending in a direction away from the compressor; and
an engine auxiliary disposed between the structural member and the support plate,
wherein the leg pieces are arranged unevenly to shield heat to provide a higher heat shielding performance on a side of the exhaust pipe than on a side of the compressor with respect to the support plate.

2. The internal combustion engine according to claim 1, wherein the one or more leg pieces provided on the side of the exhaust pipe with respect to the support plate are greater in number than the one or more leg pieces provided on the side of the compressor.

3. The internal combustion engine according to claim 1, wherein the one or more leg pieces provided on the side of the exhaust pipe with respect to the support plate have a larger width than the one or more leg pieces provided on the side of the compressor.

4. The internal combustion engine according to claim 1, wherein two of the leg pieces provided on the side of the exhaust pipe are connected to each other by an expansion wall.

5. The internal combustion engine according to claim 1, wherein an opening for allowing access to the engine auxiliary is defined between the one or more leg pieces provided on the side of the exhaust pipe and the one or more leg pieces provided on the side of the compressor.

6. The internal combustion engine according to claim 1, wherein the exhaust pipe includes a catalytic converter in a part thereof adjacent to the turbine.

7. The internal combustion engine according to claim 1, wherein
the structural member consists of a transmission connected to the engine main body,
the bracket is mounted on an upper surface of the transmission, and
the engine auxiliary consists of a starter motor.

8. The internal combustion engine according to claim 1, wherein
the engine main body includes two banks to form a V-type internal combustion engine, and
the turbine is disposed on a side of a space defined between the two banks.

* * * * *